United States Patent [19]

Hayashida et al.

[11] 4,283,993
[45] Aug. 18, 1981

[54] SERVO BOOSTER

[75] Inventors: Yoshihiro Hayashida, Chigasaki; Kiyoshi Tateoka, Fujisawa; Hiromi Ando, Tokyo, all of Japan

[73] Assignee: Tokico, Ltd., Kawasaki, Japan

[21] Appl. No.: 3,774

[22] Filed: Jan. 15, 1979

[30] Foreign Application Priority Data

Jan. 20, 1978 [JP] Japan ............................ 53/5122[U]

[51] Int. Cl.³ .................. F15B 9/10; F01B 19/00; F16J 3/02
[52] U.S. Cl. .............................. 91/376 R; 91/369 B; 92/98 D
[58] Field of Search ............ 91/369 B, 369 A, 369 R, 91/376 R, 98 D, 98 R, 99; 92/30

[56] References Cited

U.S. PATENT DOCUMENTS

| 2,559,478 | 7/1951 | Stone | 92/30 |
|---|---|---|---|
| 3,754,450 | 8/1973 | Putt et al. | 91/369 A |
| 3,981,227 | 9/1976 | Azuma | 91/369 A |
| 4,005,639 | 2/1977 | Welsh, Jr. | 91/369 A |

Primary Examiner—Paul E. Maslousky
Attorney, Agent, or Firm—Wenderoth, Lind & Ponack

[57] ABSTRACT

A servo booster including a piston plate for receiving a differential pressure produced across two chambers which are defined in a shell casing, a cylindrical valve body having a valve mechanism therein for controlling the pressure across the two chambers, an aperture and a head portion formed respectively at the center portion of the piston plate and at an end portion of the valve body and being engageable with each other at a predetermined angular position, and the relative movement of the valve body and the piston plate in the direction of the axis of the servo booster being prevented by rotating the head portion through a predetermined angle in the aperture, wherein the improvement comprises a rotation preventing member rigidly mounted on the piston plate and having one portion thereof in fitting engagement with the valve body to prevent the relative rotation of the valve body and the piston plate.

1 Claim, 6 Drawing Figures

Fig. 2
Fig. 3
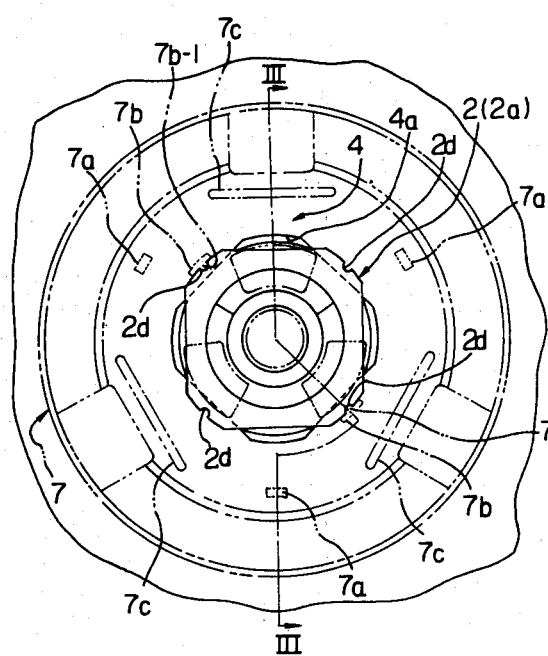
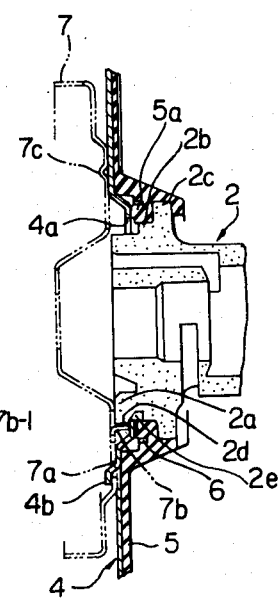

SERVO BOOSTER

BACKGROUND OF THE INVENTION

This invention relates to servo boosters and, more particularly, to improvements in a mechanism for connecting a valve body and a piston plate of a pneumatic servo booster which constitute the power piston of the servo booster.

In a conventional vacuum servo booster which is well-known as one kind of pneumatic servo booster, a power piston is constituted by a valve body disposed at the central portion of the servo booster and a piston plate which is disposed around the periphery of the valve body and which is adapted to receive a differential pressure produced across a diaphragm. In such case, the piston plate and the valve body are usually connected by bolts which also act to clamp the inner periphery of the diaphragm, and the connecting mechanism comprises a plurality of threaded holes formed in the valve body, holes in the piston plate and the bolts inserted from the side of the piston plate. However, an air passage is provided in the valve body, and thus it is necessary to arrange the threaded holes radially outside of the air passage which inevitably increases the outer diameter of the valve body. Further, in attaining the desired tightening force in such a screw-thread connection, the threaded holes are required to have a depth greater than a predetermined amount thus increasing the thickness of the valve body. Further, there are problems in the strength with respect to the tightening stress produced around the threaded holes and with respect to the thermal stress when the valve body is formed of a synthetic resin material. Further, the bolts project from the front surface of the piston plate thereby occupying a space which could otherwise be utilized to hold other parts of the servo booster.

In order to solve the problems aforementioned there has been proposed a vacuum booster wherein an aperture and a head portion are provided respectively at the center portion of the piston plate and at one end (the inner end) portion of the valve body and which are engageable with each other at a predetermined angular position, whereby the piston plate is secured to the valve body by being rotated through a predetermined angle in the aperture with the inner circumference of the diaphragm being clamped between the plate and, a neck portion which is formed adjacent to the head portion of the valve body.

However, since the relative rotation of the piston plate and the valve body is prevented only by the interference of the diaphragm in the direction of the thickness thereof, there is the shortcoming that the valve body will rotate relative to the piston plate due to vibrations or to the decrease in the interference due to the aging of the diaphragm during a long period of usage thereby permitting the valve body to become engaged from the piston plate.

SUMMARY OF THE INVENTION

An object of the present invention is to prevent the aforesaid shortcomings by providing a rotation preventing member which is non-rotatably mounted on the piston plate and, when the head portion of the valve body has been inserted through the aperture of the piston plate and rotated through a predetermined angle with respect to the piston plate, a portion of the rotation preventing member engages with the valve body so as to prevent the relative rotation of the valve body and the piston plate.

Preferably the portion of the rotation preventing member resiliently engages the valve body in a projection-and-recess engagement.

BRIEF DESCRIPTION OF THE DRAWINGS

The present invention will be better understood from the following description with reference to the drawings, wherein:

FIG. 2 is an end view of the essential portion of the vacuum servo booster of FIG. 1;

FIG. 3 is a cross-section taken along line III—III in FIG. 2;

PREFERRED EMBODIMENTS OF THE INVENTION

Figure 1:
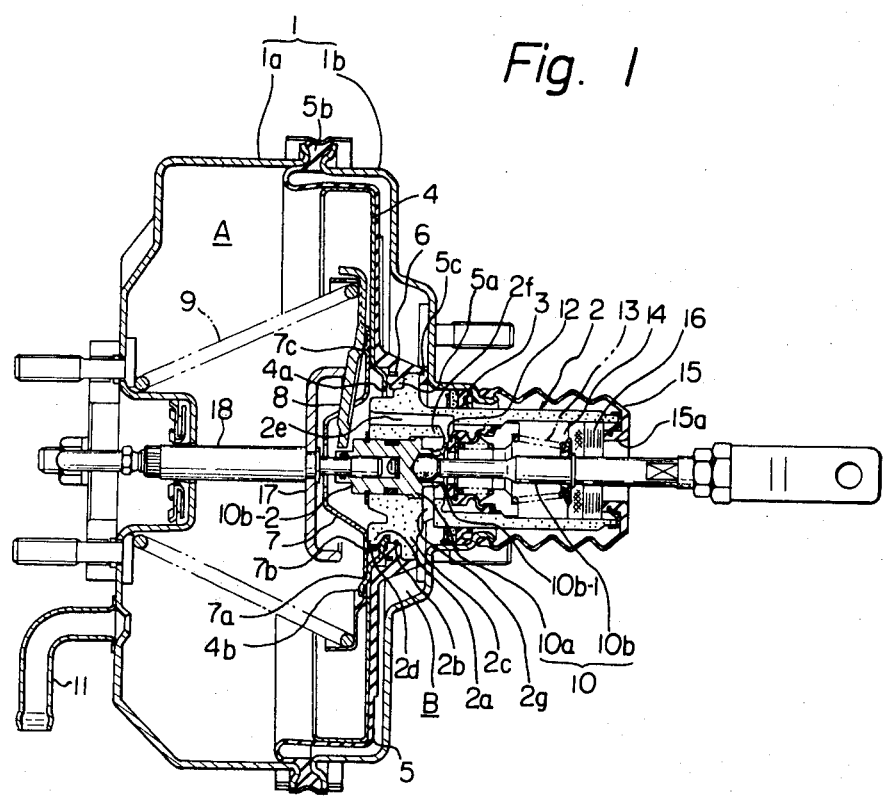
FIG. 1 is a longitudinal section of a vacuum servo booster according to the present invention.

The vacuum servo booster shown in FIG. 1 comprises a main body or a shell casing 1 consisting of a front shell 1a and a rear shell 1b forming a closed container, a valve body 2 slidably supported in the main body 1 in a seal member 3 and having therein a valve mechanism controlling the differential pressure across two chambers A and B defined in the main body 1, a piston plate 4, and a diaphragm 5 dividing the interior of the main body 1 into the two chambers A and B and receiving the differential pressure in cooperation with the piston plate 4.

On the inner or the left end of the valve body 2 as viewed in FIG. 1, there is formed a head portion 2a having a non-circular configuration such as shown in FIG. 2 and, an aperture 4a having a configuration corresponding to the head portion 2a is formed at the central portion of the piston plate 4. The aperture 4a can receive therethrough the head portion 2a of the valve body 2 at a predetermined angular positional relationship. The head portion 2a of the valve body 2 and the aperture 4a of the piston plate 4 may have any suitable configuration other than a circle, but preferably, there is defined an inscribed circle of a suitable diameter therein. A neck portion 2b is formed adjacent to the head portion 2a of the valve body. The configuration of the neck portion 2b is such that the piston plate 4 can rotate around the neck portion when the head portion 2a has been passed through the aperture 4a, and preferably, the neck portion 2b is defined by the inscribed circle in the head portion 2a for good mechanical strength. Further, an annular flange or projection 2c is formed adjacent to the neck portion 2b of the valve body 2 such that the inner peripheral portion 5a of the diaphragm 5 can be clamped between the annular flange 2c of the valve body 2 and the piston plate 4.

Thus, in assembling a power piston according to the present invention, the inner peripheral portion 5a of the diaphragm 5 is firstly located on the annular projection 2c of the valve body 2, then the piston plate 4 is fitted on the valve body 2 with the aperture 4a of the piston plate 4 and the head portion 2a of the valve body 2 being aligned at a predetermined angular positional relationship and the piston plate 4 is pushed in the direction of the axis of the valve body 2 against the resiliency of the inner peripheral portion 5a of the diaphragm 5 and, after passing through the head portion 2a of the valve body 2, the piston plate 4 is rotated through a predetermined angle (in the embodiment of FIG. 2, a suitable angle less than 90°, preferably 45°) with respect to the valve body 2 and around the neck portion 2b of the valve body 2, whereby, the inner peripheral portion of the aperture 4a of the piston plate 4 engages with and is retained by a generally radial shoulder 2e defined between the head portion 2a and the neck portion 2b of the valve body 2 and the valve body 2, the piston plate 4 and the diaphragm 5 are tightly connected due to the resiliency of the diaphragm in the direction of the thickness thereof, thereby constituting the power piston.

Thereafter, the outer peripheral portion 5b of the diaphragm 5 is clamped between the shells 1a and 1b. Shown at 6 in FIGS. 1 and 3 is a ring fitted in an annular groove of the diaphragm 5 so as to prevent the material of the inner peripheral portion 5a of the diaphragm 5 from escaping in the radially outward direction when compressing the inner peripheral portion in the thicknesswise direction, whereby a predetermined interference can be assured.

A retaining plate 7 is non-rotatably mounted on the piston plate 4 with a plurality of pawl portions 4b of the piston plate 4 being inserted in small openings 7a of the retaining plate 7 and being caulked thereon. The pawl portions 4b are formed by a cutting and bending process. Two pawl portions 7b are formed on the retaining plate 7 by cutting and bending in the rightward direction as viewed in FIGS. 1 and 3. The pawl portions 7b are adapted to resiliently engage with the maximum diameter portion of the head portion 2a of the valve body 2.

In each of the maximum diameter portions of the head portion 2a of the valve body 2 there is formed a recess 2d extending in the direction of the axis of the valve body 2 as shown in FIG. 2 and, a projection 7b-1 is formed on each of the pawl portions 7b of the retaining plate 7. Thus, the pawl portion 7b resiliently engages with the valve body 2 in a projection-and-recess engagement, thereby preventing the relative rotation between the piston plate 4 and the valve body 2.

In this embodiment, a plurality of projections 7c are formed on the surface of the retaining plate 7 which rectilinearly extend in the direction perpendicular to radii of the valve body 2 respectively and act respectively as fulcrums for rocking movement of reaction levers 8. The reaction levers 8 are adapted to transmit the output force of the servo booster from the power piston to an output member 18 and also to transmit the reaction force to an input member 10.

Figure 4:
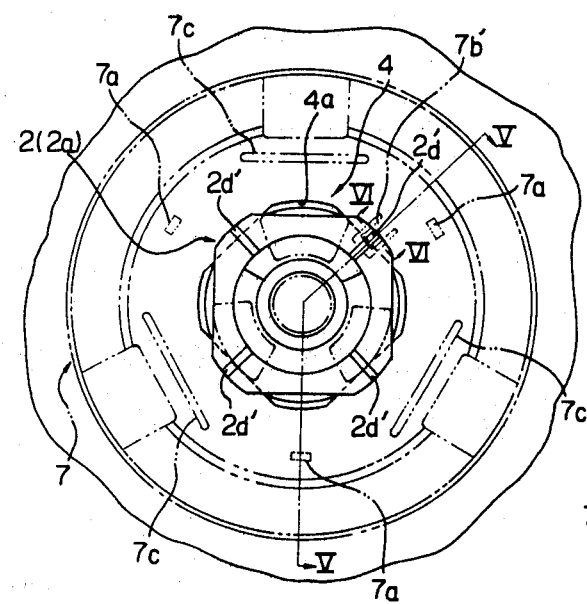
FIG. 4 is an end view similar to FIG. 2 but showing a modified form.
Figure 5:
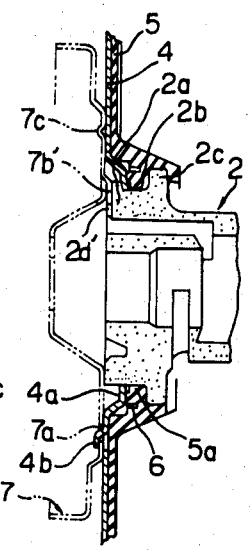
FIG. 5 is a cross-section taken along line V—V in FIG. 4.
Figure 6:
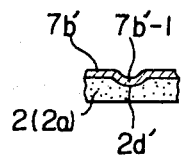
FIG. 6 is a cross-section taken along line VI—VI in FIG. 4.

Another embodiment of the present invention is shown in FIGS. 4-6 wherein parts corresponding to the first embodiment are denoted by the same reference numerals and the detailed description thereof is omitted. In the second embodiment, a pawl portion 7b' of the retaining plate 7 engages with the end surface (the left end surface as viewed in FIG. 5) of the valve body 2. Radially extending recessed portions 2d' are formed in the valve body 2 and a correspondingly shaped projection 7b'-1 is formed on the pawl portion 7b'.

The pawl portions 7b and 7b' in these embodiments resiliently engage with the valve body 2. However, the pawl portions 7b and 7b' need not resiliently engage with the valve body 2 when the projections 7b-1 and 7b'-1 are fitted in the recessed portions 2d and 2d' provided that the pawl portions can resiliently deflect in the process of forming the projection-and-recess engagement. Further, the projections 7b-1 and 7b'-1 are formed on the pawl portions 7b, 7b' and the recessed portions 2d and 2d' are formed in the valve body 2 in the embodiments as disclosed, but the projections and the recessed portions may be formed respectively on the valve body 2 and the pawl portions 7b and 7b'.

Now, a brief description will be given of the operation and the functions of the vacuum servo booster of FIG. 1 together with a description relating to parts which are not described heretofore. When the input member 10 consisting of a rod 10a which is associated with a brake pedal or the like (not shown) and a plunger 10b connected to the rod 10a is not actuated, the valve body 2 and the piston plate 4 are pressed in the rightward direction as viewed in the drawing by a return spring 9 and are maintained at the position shown in the drawing with stops 5c (only one is shown in the drawing) of the diaphragm 5 abutting the rear shell 1b. At that position, the chamber A which is normally connected to a source of vacuum such as an intake manifold of an engine through a pipe 11 is communicated with the chamber B through openings formed in the retaining plate 7, an axial passage 2e in the valve body 2, a clearance between a valve seat 2f of the valve body 2 and a poppet valve 12, and a radial passage 2g in the valve body 2 and, therefore, the two chambers A and B are at the same pressure and the power piston consisting of the valve body 2, the diaphragm 5 and the piston plate 4 is not displaced.

When the input rod 10a is pushed leftward against the force of a return spring 13, the poppet valve 12 moves forward (leftward) with respect to the valve body 2 which is still at that moment and engages with the valve seat 2f thereby interrupting the communication between the chambers A and B. When the input member 10 moves further in the same direction a valve seat 10b-1 of the plunger 10b which is slidably received in the valve body 2 separates from the poppet valve 12 thereby communicating the chamber B with a chamber 14 through the radial passage 2g.

The chamber 14 is connected with atmosphere through an air inlet opening 15a in a dust boot 15 and an air filter 16, and thus the pressure in the chamber B rises toward the atmospheric pressure, whereby a differential pressure is generated between the chambers A and B and the diaphragm 5, the valve body 2 and the piston plate 4 move together in the leftward direction as viewed in FIG. 1. Thus, the servo motor starts to operate, and the output force is transmitted through the piston plate 4, the reaction levers 8, and the output member 18 to a piston of a hydraulic master cylinder (not shown), and the hydraulic pressure generated in the master cylinder is transmitted to wheel brakes (not shown).

The input member 10 receives the reaction force of the output of the servo motor. The reaction of the force acting on the output member 18 is transmitted through a fulcrum plate 17 and reaction levers 8 to the plunger 10b. The reaction levers 8 rockingly move in the counterclockwise direction as viewed in FIG. 1 around projections 7c which act as fulcrums and the inner ends of the reaction levers 8 abut a shoulder 10b-2 formed on the plunger 10b to transmit the reaction force to the input member 10.

Due to the forward movement of the valve body 2, the poppet valve 12 engages with the valve seat 10b-1 of the plunger 10 to interupt the communication between the chamber B and the atmosphere. There is formed an equilibrium condition between the differential pressure force acting on the piston plate 4, the spring force of the springs 9 and 13, the pressing force acting on the input rod 10a and the reaction force of the output member 13. When the pressing force acting on the input rod 10a is reduced, a clearance is formed between the poppet valve 12 and the valve seat 25 of the valve body 2 thus reducing the pressure in the chamber B.

In the embodiments shown the portions 7b and 7b' acting as members preventing relative rotation between the piston plate 4 and the valve body 2 are simply formed on the retaining plate 7 which has been incorporated in the prior art servo motor, which is advantageous from the viewpoint of reducing the number of parts. However, a member similar to the portion 7b or 7b' be non-rotatably mounted on the piston plate 4 or on the retaining plate 7. Further, the invention can be applied not only to vacuum servo boosters wherein the differential pressure is generated between a vacuum pressure chamber A and a pressure equal to or less than the atmospheric pressure but also to pressure type servo motors wherein two chambers are at a high pressure and the atmospheric pressure or at a high pressure and the vacuum pressure.

As described hereinbefore, according to the present invention, a rotation preventing member non-rotatably mounted on the piston plate engages with the valve body in a projection-and-recess engagement to prevent relative rotation between the valve body and the piston plate, so that relative rotation can be reliably prevented for a long period of usage irrespective of the aging of the diaphragm.

Further, the projection-and-recess engagement between the valve body and the rotation preventing member can reliably prevent the relative rotation therebetween, which is particularly advantageous for a servo booster which is subject to vibrations in usage.

We claim:

1. A servo-booster comprising:
a shell casing;
a piston plate and a diaphragm cooperating therewith and extending across said shell casing for defining two chambers therein and for receiving a differential pressure produced between said two chambers, said piston plate having a non-circular opening therethrough;
a cylindrical valve body having therein a valve mechanism for controlling the pressure across the two chambers, said valve body having a head portion with a non-circular configuration at one end thereof, said head portion having a radial shoulder at a location spaced from said one end and facing in the direction toward the other end of said valve body, the configuration of said head portion being the same as that of said non-circular opening in said piston plate and said head portion being insertable through said opening in said piston plate when said head portion is in a predetermined angular relationship with said opening, said valve body and said piston plate being connected with one another by inserting said head portion through said opening in said piston plate and rotating said valve body and piston plate relative to each other for engaging said radial shoulder with said piston plate; and
a retaining plate non-rotatably mounted on said piston plate and having a portion bent out of the plane of said retaining plate, said head portion having a recess therein for engagement by said bent out portion in projection-and-recess engagement when said valve body is rotated relative to said piston plate for holding said piston plate and said valve body in engagement for preventing only relative rotation of said valve body and said piston plate.

* * * * *